(12) United States Patent
Dittmer

(10) Patent No.: US 7,866,622 B2
(45) Date of Patent: Jan. 11, 2011

(54) IN-WALL MOUNT

(75) Inventor: Jay Dittmer, Prior Lake, MN (US)

(73) Assignee: Milestone AV Technologies LLC, Savage, MN (US)

( * ) Notice: Subject to any disclaimer, the term of this patent is extended or adjusted under 35 U.S.C. 154(b) by 95 days.

(21) Appl. No.: 12/197,821

(22) Filed: Aug. 25, 2008

(65) Prior Publication Data

US 2009/0050763 A1 Feb. 26, 2009

Related U.S. Application Data

(63) Continuation of application No. PCT/US2008/000130, filed on Jan. 4, 2008.

(60) Provisional application No. 60/883,652, filed on Jan. 5, 2007, provisional application No. 60/957,937, filed on Aug. 24, 2007, provisional application No. 60/957,941, filed on Aug. 24, 2007.

(51) Int. Cl.
*F16M 13/00* (2006.01)

(52) U.S. Cl. ..................... 248/421; 248/917

(58) Field of Classification Search ............... 248/917, 248/919–923, 274.1, 289.11, 282.2, 283.1, 248/286.1, 287.1, 295.11, 370, 421, 918, 248/277.1; 361/679.01, 679.02, 679.05, 361/679.06, 679.57, 679.58
See application file for complete search history.

(56) References Cited

U.S. PATENT DOCUMENTS

| | | | |
|---|---|---|---|
| 153,943 A | 8/1874 | Gray | |
| 212,618 A | 2/1879 | Miller | |
| 257,050 A | 4/1882 | Munson | |
| 1,282,489 A | 10/1918 | Strodel | |
| 1,320,775 A | 11/1919 | Mather | |
| 1,358,159 A | 11/1920 | Kern | |
| 1,574,227 A | 2/1926 | Andersen | |
| 1,628,218 A | 5/1927 | Beauchamp | |
| 1,646,379 A | 10/1927 | Whitehead | |
| 1,997,153 A | 10/1934 | Spence, Jr. | |
| 2,030,889 A | 2/1936 | Negrotto | |

(Continued)

FOREIGN PATENT DOCUMENTS

JP 63-171077 11/1988

OTHER PUBLICATIONS

Peerless®, *Technical Data Sheet—Solid-Point™ Articulating Swivel Plasma Mount*, Models: PLA1, PLA 1S, Issued Jun. 19, 2002, Sheet No: 200-9705-13 Nov. 15, 2005, 3 Pgs.

(Continued)

*Primary Examiner*—Terrell Mckinnon
*Assistant Examiner*—Erin Smith
(74) *Attorney, Agent, or Firm*—Patterson Thuente Christensen Pedersen, P.A.

(57) ABSTRACT

An in-wall mount for supporting an electronic display from a wall. The in-wall mount includes a wall interface structure, a display interface structure, and an extensible arm assembly. The display interface structure is selectively outwardly shiftable relative to the wall interface structure between a first position wherein the display interface structure is proximate the wall interface structure and a second position wherein the display interface structure is spaced apart from the wall interface structure, the display interface structure rising vertically relative to the wall interface structure as the display interface structure is shifted from the first position to the second position.

21 Claims, 16 Drawing Sheets

U.S. PATENT DOCUMENTS

| | | |
|---|---|---|
| 2,233,882 A | 3/1941 | Bobek |
| 2,466,219 A | 4/1949 | Farrell et al. |
| 2,734,708 A | 2/1956 | Cohn |
| 3,182,946 A | 5/1965 | Dudko |
| 3,574,340 A | 4/1971 | Busche |
| 4,483,503 A | 11/1984 | Gahan |
| 4,483,803 A | 11/1984 | Rizkalla |
| 4,549,710 A | 10/1985 | Prince et al. |
| 4,554,590 A | 11/1985 | Chelin et al. |
| 4,621,782 A | 11/1986 | Carlson et al. |
| 4,645,153 A | 2/1987 | Granzow et al. |
| 4,652,890 A | 3/1987 | Crean |
| 4,708,312 A | 11/1987 | Rohr |
| 4,718,317 A | 1/1988 | Hensler |
| 4,768,744 A | 9/1988 | Leeds et al. |
| 4,814,759 A * | 3/1989 | Gombrich et al. ............. 345/60 |
| 4,836,478 A | 6/1989 | Sweere |
| 4,836,486 A | 6/1989 | Vossoughi et al. |
| 4,844,387 A | 7/1989 | Sorgi et al. |
| 4,880,191 A | 11/1989 | Lake, Jr. |
| 4,934,645 A | 6/1990 | Breslow |
| 4,989,813 A | 2/1991 | Kim et al. |
| 5,037,050 A | 8/1991 | Lin et al. |
| 5,040,759 A | 8/1991 | Wainwright |
| 5,102,081 A | 4/1992 | Barchus |
| 5,139,223 A | 8/1992 | Sedighzadeh |
| 5,165,644 A | 11/1992 | Allen |
| 5,195,900 A | 3/1993 | Kumagai et al. |
| 5,209,446 A | 5/1993 | Kawai |
| 5,277,392 A | 1/1994 | Rossman et al. |
| 5,322,255 A | 6/1994 | Garrett |
| 5,398,901 A | 3/1995 | Brodmann et al. |
| 5,404,182 A | 4/1995 | Nomura |
| D361,062 S | 8/1995 | Iino et al. |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,584,735 A | 12/1996 | McMath |
| 5,603,478 A | 2/1997 | Wang |
| 5,632,463 A | 5/1997 | Sung et al. |
| 5,634,622 A | 6/1997 | Pye |
| 5,664,752 A | 9/1997 | Matthiessen et al. |
| 5,687,939 A | 11/1997 | Moscovitch |
| 5,687,944 A | 11/1997 | Shon |
| 5,713,549 A | 2/1998 | Shieh |
| 5,732,922 A | 3/1998 | Jeon |
| 5,743,503 A | 4/1998 | Voeller et al. |
| 5,751,548 A | 5/1998 | Hall et al. |
| 5,768,648 A | 6/1998 | Skipp et al. |
| D395,892 S | 7/1998 | Solomon |
| 5,797,568 A | 8/1998 | Gongora et al. |
| 5,842,672 A | 12/1998 | Sweere et al. |
| 5,854,735 A | 12/1998 | Cheng |
| 5,918,841 A | 7/1999 | Sweere et al. |
| 5,918,845 A | 7/1999 | Whitaker |
| 5,923,528 A | 7/1999 | Lee |
| 5,924,665 A | 7/1999 | Sweere et al. |
| 5,941,493 A | 8/1999 | Cheng |
| 5,947,429 A | 9/1999 | Sweere et al. |
| D415,768 S | 10/1999 | Howell |
| 5,992,809 A | 11/1999 | Sweere et al. |
| 6,000,560 A | 12/1999 | Barkan |
| 6,012,693 A | 1/2000 | Voeller et al. |
| 6,015,120 A | 1/2000 | Sweere et al. |
| 6,019,332 A | 2/2000 | Sweere et al. |
| 6,036,337 A | 3/2000 | Belfer |
| 6,042,068 A | 3/2000 | Tcherny |
| 6,045,103 A | 4/2000 | Costa et al. |
| 6,047,939 A | 4/2000 | Kim |
| 6,048,013 A | 4/2000 | Moilanen et al. |
| 6,068,227 A | 5/2000 | Morgan et al. |
| 6,102,348 A | 8/2000 | O'Neill |
| 6,113,047 A | 9/2000 | Wung et al. |
| 6,119,997 A | 9/2000 | Lieshout |
| 6,125,030 A | 9/2000 | Mola et al. |
| 6,126,128 A | 10/2000 | Costa et al. |
| 6,138,970 A | 10/2000 | Sohrt et al. |
| RE36,978 E | 12/2000 | Moscovitch |
| 6,189,842 B1 | 2/2001 | Bergeron Gull et al. |
| 6,189,850 B1 | 2/2001 | Liao et al. |
| D440,863 S | 4/2001 | Worrall |
| 6,213,438 B1 | 4/2001 | Ostby et al. |
| 6,213,821 B1 | 4/2001 | Bernloehr et al. |
| 6,244,552 B1 | 6/2001 | Adams et al. |
| 6,264,152 B1 | 7/2001 | Bloch et al. |
| 6,273,382 B1 | 8/2001 | Pemberton |
| 6,292,981 B1 | 9/2001 | Ford et al. |
| 6,315,259 B1 | 11/2001 | Kolb |
| 6,336,037 B1 | 1/2002 | Sekine et al. |
| 6,340,146 B1 | 1/2002 | Tzeng |
| 6,347,776 B1 | 2/2002 | Chuang |
| 6,354,549 B2 | 3/2002 | Sweere et al. |
| 6,361,012 B1 | 3/2002 | Chang |
| 6,367,756 B1 | 4/2002 | Wang |
| 6,378,171 B1 | 4/2002 | Suzuki et al. |
| 6,378,830 B1 | 4/2002 | Lu |
| 6,394,403 B1 | 5/2002 | Hung |
| 6,402,109 B1 | 6/2002 | Dittmer |
| 6,409,127 B1 | 6/2002 | VanderHeide et al. |
| 6,409,134 B1 | 6/2002 | Oddsen, Jr. |
| D460,078 S | 7/2002 | Li |
| 6,416,027 B1 | 7/2002 | Hart |
| 6,418,010 B1 | 7/2002 | Sawyer |
| 6,419,196 B1 | 7/2002 | Sweere et al. |
| 6,450,467 B2 | 9/2002 | Timm |
| 6,453,509 B1 | 9/2002 | Shin |
| 6,454,234 B1 | 9/2002 | Westbrook |
| 6,478,274 B1 | 11/2002 | Oddsen, Jr. |
| 6,478,275 B1 | 11/2002 | Huang |
| 6,484,987 B2 | 11/2002 | Weaver |
| 6,494,429 B2 | 12/2002 | Tajima |
| 6,505,988 B1 | 1/2003 | Oddsen, Jr. |
| 6,510,049 B2 | 1/2003 | Rosen |
| 6,517,040 B1 | 2/2003 | Wen |
| 6,530,546 B1 | 3/2003 | Cyrell |
| 6,543,734 B2 | 4/2003 | Yeh |
| 6,554,238 B1 | 4/2003 | Hibberd |
| 6,554,242 B2 | 4/2003 | Kim |
| 6,559,829 B1 | 5/2003 | Matsuo et al. |
| 6,560,094 B2 | 5/2003 | Schmidt |
| 6,565,056 B2 | 5/2003 | Lin |
| 6,575,419 B1 | 6/2003 | Masuda et al. |
| D477,606 S | 7/2003 | Theis et al. |
| 6,585,203 B1 | 7/2003 | Euker |
| 6,592,090 B1 | 7/2003 | Li |
| 6,594,143 B2 | 7/2003 | Yano et al. |
| 6,604,722 B1 | 8/2003 | Tan |
| 6,654,235 B2 | 11/2003 | Imsand |
| 6,663,064 B1 | 12/2003 | Minelli et al. |
| 6,671,928 B2 | 1/2004 | Huang |
| 6,672,553 B1 | 1/2004 | Lin |
| 6,695,270 B1 | 2/2004 | Smed |
| 6,752,363 B2 | 6/2004 | Boele |
| D493,800 S | 8/2004 | Pfister et al. |
| D494,596 S | 8/2004 | Pfister |
| D494,978 S | 8/2004 | Pfister |
| D495,713 S | 9/2004 | Pfister et al. |
| 6,874,743 B2 | 4/2005 | Watanabe et al. |
| 6,905,101 B1 | 6/2005 | Dittmer |
| 6,923,413 B2 | 8/2005 | Dozier |
| 6,966,532 B2 | 11/2005 | Ishizaki et al. |
| 7,028,961 B1 | 4/2006 | Dittmer et al. |

| | | |
|---|---|---|
| 7,152,836 B2 | 12/2006 | Pfister et al. |
| 7,152,837 B1 | 12/2006 | Babjak |
| 7,178,775 B2 | 2/2007 | Pfister et al. |
| 7,296,774 B2 | 11/2007 | Oh |
| D569,381 S | 5/2008 | Sculler et al. |
| 7,395,996 B2 | 7/2008 | Dittmer |
| 7,438,269 B2 | 10/2008 | Pfister et al. |
| 2001/0050327 A1 | 12/2001 | Sweere et al. |
| 2002/0011544 A1 | 1/2002 | Bosson |
| 2002/0033436 A1 | 3/2002 | Peng et al. |
| 2002/0084396 A1 | 7/2002 | Weaver |
| 2002/0179801 A1 | 12/2002 | Kim |
| 2002/0190180 A1 | 12/2002 | Cotterill |
| 2003/0042385 A1 | 3/2003 | Hung et al. |
| 2003/0057340 A1* | 3/2003 | Mann et al. ............ 248/274.1 |
| 2003/0075653 A1 | 4/2003 | Li |
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011932 A1 | 1/2004 | Duff |
| 2004/0011938 A1 | 1/2004 | Oddsen, Jr. |
| 2004/0211870 A1 | 10/2004 | Bremmon |
| 2004/0232298 A1 | 11/2004 | Bremmon |
| 2004/0232301 A1 | 11/2004 | Bremmon et al. |
| 2004/0245420 A1 | 12/2004 | Pfister et al. |
| 2005/0051688 A1 | 3/2005 | Dittmer |
| 2005/0133678 A1 | 6/2005 | Dittmer |
| 2005/0263659 A1 | 12/2005 | Pfister et al. |
| 2007/0090250 A1 | 4/2007 | O'Keene |
| 2007/0176067 A1 | 8/2007 | Monaco |
| 2007/0181762 A1 | 8/2007 | Dittmer |
| 2007/0235614 A1 | 10/2007 | O'Keene et al. |

OTHER PUBLICATIONS

Peerless®, *Assembly Instructions for Locking Desktop Swivel with Tilt Cup,* Models: LDS 307A, LDS 314A, LDS 334A, LDS 354A, MIS 043, Sheet No. 047-9006, Issued Oct. 21, 1991, pp. 2.

Peerless®, *Assembly Instructions for Adjustable Tilt Wall Mounts,* Models: LWB 314A, LWB 334A, LWB 354A, LWB 530A, Sheet No. 029-9002, Issued Mar. 17, 1993, pp. 2.

Peerless®, *Assembly Instructions Retrofit Kit for Peerless Products With Adjustable Tilt Tray,* Sheet No: 1SL-61TV01, Issued: Jan. 31, 1995, Revision: A2-14-95, pp. 1.

Brochure Entitled: "*The Perfect Mounting Systems*", Issued Jul. 16, 1994, Revision 083-1N02.PMS, 2 Pgs.

CAD Drawings printout for Rhinomounts, dated Jul. 22, 2005, 9 Pgs.

Peerless®, *Technical Data Sheet for Tilt Wall Mount for NEC™ PX-42VP1A & PX-50VP1A Plasma Monitor,* Model: PLWTNECPD1, Issued Mar. 21, 2000, pp. 1.

Peerless®, *Installation and Assembly—Computer Box for NED Plasma,* Models: MIS 086, Issued Dec. 6, 2001, Sheet #: 200-9274-1, 2 Pgs.

Peerless®, *Installation and Assembly—Plasma Adapter bracket for Zenith™ H40DVPDP Plasma Monitor,* Model: PLP ZN40, Issued: Jun. 22, 2001 Sheet #: 200-9238-1 Dec. 3, 2004, pp. 1.

Peerless®, *Technical Data Sheet—Solid Point™ Universal Adapter Bracket for Large Flat Panel Screens,* Model: PLP UN-1, Issued Oct. 8, 2002, Sheet No: 200-9741-12, Jul. 15, 2005, 2 Pgs.

Peerless®, *Technical Data Sheet—Universal Single Stud Tilting Wall Mount,* Models: RTPTS 1, RTPTS 1S, Issued: May 19, 2003, Sheet No: 201-9519-9, May 12, 2006, 6 Pgs.

Peerless®, *Installation and Assembly—Solid-Point™ Flat Wall Mount for Zenith Plasma Model DPDP6OW,* Issued Feb. 21, 2005, Sheet #: 200-9246-6 Jul. 14, 2005, 1 Pg.

Peerless®, *Installation and Assembly—Plasma Adapter bracket for Sony™ PFM-50C1 Plasma Monitor,* Model: PLB SONY50, Issued: Sep. 26, 2002, Sheet #: 200-9437-1, 2 Pgs.

Peerless®, *Installation and Assembly—Plasma Asapter Bracket for 61" NEC™ PlasmaSync 61MP1 & 61MX2 Plasma Screens,* Model: PLP NEC61PD1, Issued Nov. 10, 2003, Sheet # 201-9127-2 Sep. 23, 2004, 3 Pgs.

Peerless®, *Installation and Assembly—Secure Wall Mount for Phillips, for use with Phillips model 42PW9962 flat screen TV,* Model PLWPHIL42, Issued: Aug. 12, 1998, Sheet #: 200-9009/C May 25, 2000, 4 Pgs.

Peerless®, *Installation and Assembly—SolidPoint™ Articulating Swivel Arm for 32"-50" Plasma Screens, Models:* PLA 1, PLA 1S, PLA1 UNL, PLA 1 UNLS, Issued: Jun. 7, 2002, Sheet #: 200-9378-14 Dec. 28, 2005, 14 Pgs.

Brochure Entitled: Peerless®, *Installation and Assembly SmartMount™ Universal Tilt Wall Mount for 13"-42" Screens,* Models: ST 635, ST 635-S, Issued: Apr. 22, 2005, Sheet#: 201-9442-5, Dec. 14, 2005, 9 Pgs.

Brochure Entitled: Peerless®, *Installation and Assembly: Universal Tilt Wall Mounts,* Issued: Jan. 13, 2006, Sheet #: 202-9030-02, Jan. 30, 2006, 24 Pgs.

Brochure Entitled: Panel Display Pivot Mount for Model PDS 625, 2 Pgs., Admitted Prior Art, no date available.

Brochure Entitled: Panel Display Pivot Mount for Model Nos. PDS 110 and PDM 120, 2 Pgs. Admitted prior art, no. date available.

Plasma TV Wall Mount Installation Manual Entitled:*Wall Mount Kit for Plasma TV Screens,* Rev 1.0, dated Nov. 2003, 12 Pgs.

Brochure Entitled: Peerless®, Flat Panel SmartMount™ Universal Tilt Wall Mount for 32" to 50" Plasma and LCD Flat Panel Screens, 2 Pgs., ©2006.

Brochure Entitled: Peerless®, Flat Panel SmartMount™ Universal Tilt Wall Mount for 61" to 102" Plasma and LCD Flat Panel Screens, 2 Pgs., ©2006.

Brochure Entitled: Peerless®, Flat Panel SmartMount™ Universal Tilt Wall Mount for 42" to 71" Plasma and LCD Flat Panel Screens, 2 Pgs., ©2006.

Brochure Entitled: Peerless®, Flat Panel SmartMount™ Universal Tilt Wall Mount for 32" to 60" Plasma and LCD Flat Panel Screens, 2 Pgs., ©2006.

Brochure Entitled: Peerless®, Flat Panel SmartMount™ Universal Tilt Wall Mount for 23" to 46" LCD Flat Panel Screens, 2 Pgs., ©2006.

Brochure Entitled: Peerless®, Flat Panel SmartMount™ Universal Flat Wall Mount for 61" to 102" Plasma and LCD Flat Panel Screens, 2 Pgs., ©2006.

Brochure Entitled: Peerless®, Flat Panel SmartMount™ Universal Flat Wall Mount for 42" to 71" Plasma and LCD Flat Panel Screens, 2 Pgs., ©2006.

Brochure Entitled: Peerless®, Flat Panel SmartMount™ Universal Flat Wall Mount for 32" to 60" Plasma and LCD Flat Panel Screens, 2 Pgs., ©2006.

Brochure Entitled: Peerless®, Flat Panel SmartMount™ Universal Flat Wall Mount for 23" to 46" LCD Flat Panel Screens, 2 Pgs,, ©2006.

Brochure Entitled: Peerless® Solid Solutions—Solid Support™ Installation and Assembly: SmartMount™ Universal Tilt Wall Mount for 22" to 49" Screens, 8 Pgs., Issued Mar. 31, 2005.

ViewSonic Mount, 1 pg., circa 2005.

Hitachi Mount, 1 Pg., circa 2005.

\* cited by examiner

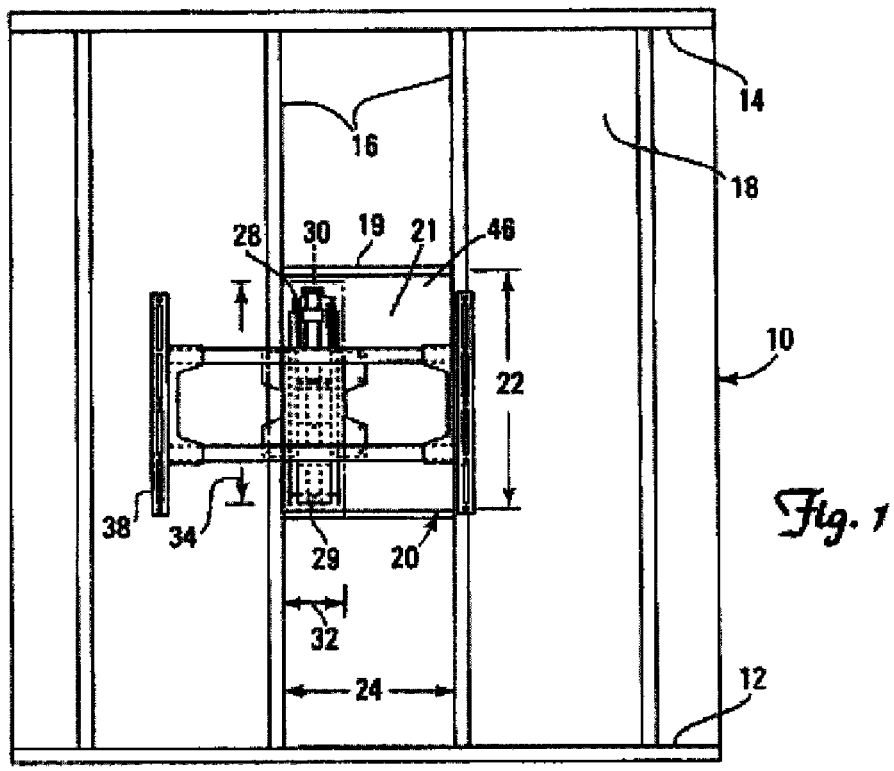
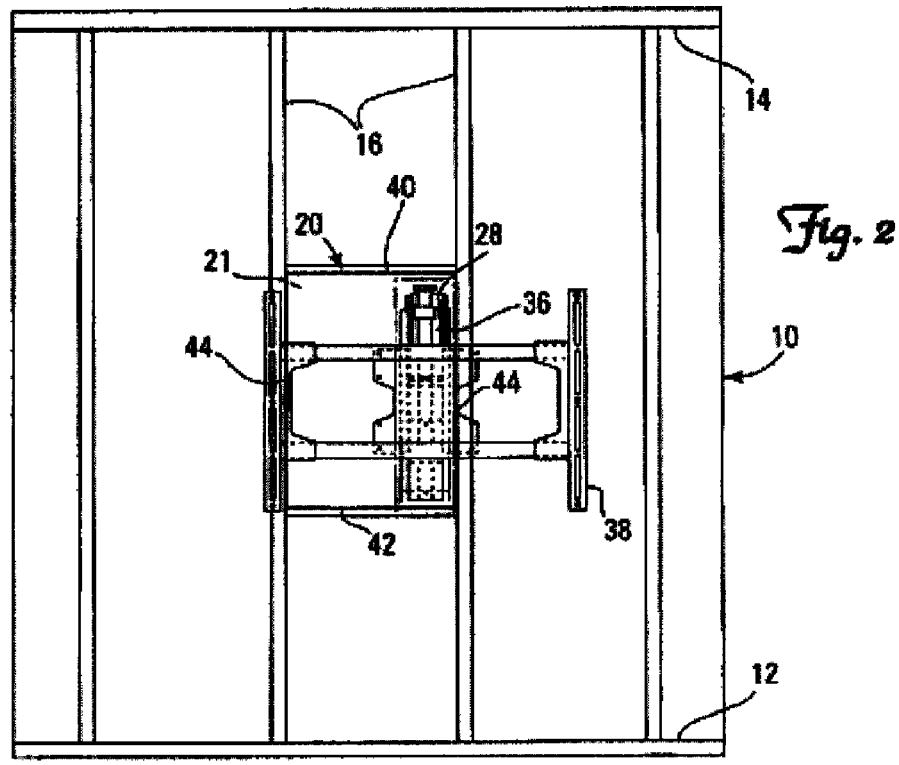

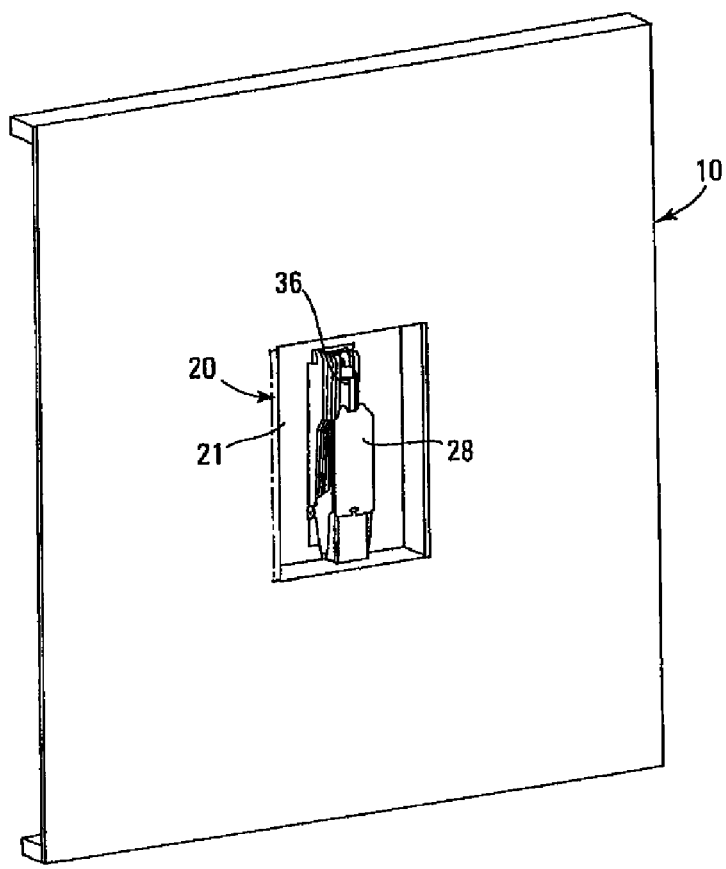
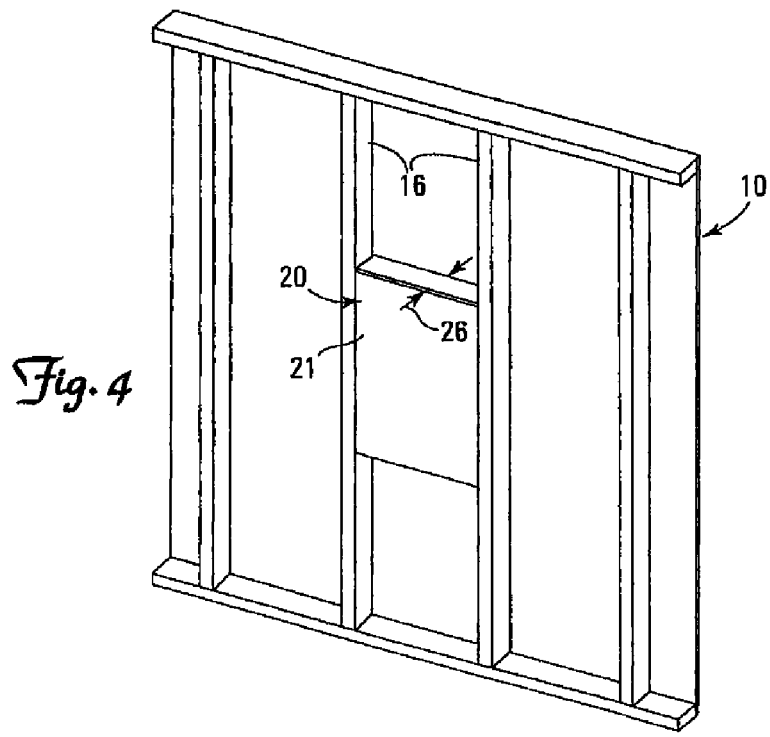

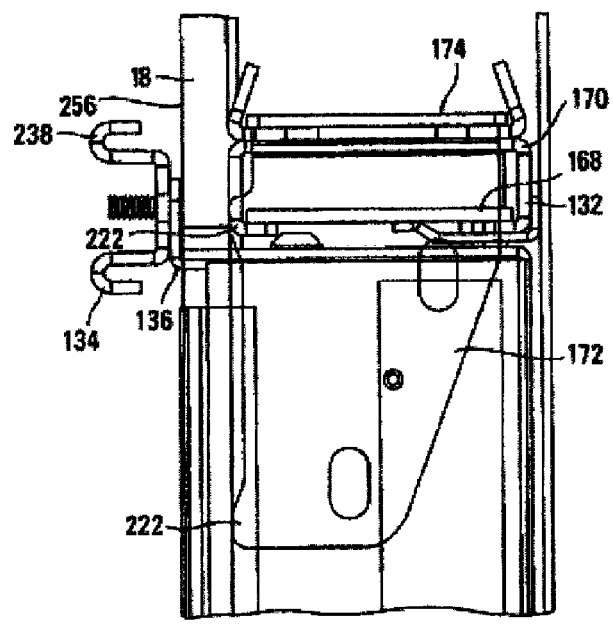
Fig. 19
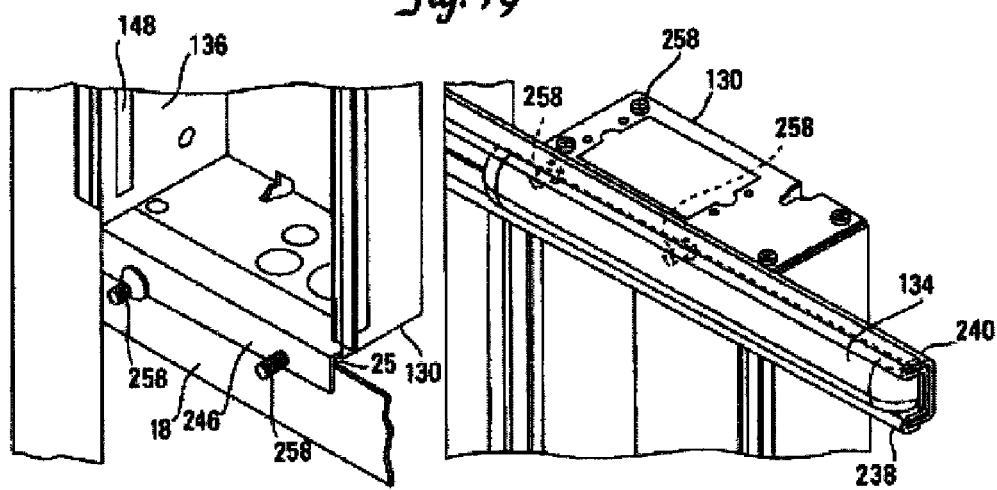
Fig. 17
Fig. 18

IN-WALL MOUNT

RELATED APPLICATIONS

This application is a continuation under 35 U.S.C. §120 of International Application PCT/US2008/000130, filed Jan. 4, 2008, entitled IN-WALL MOUNT, which claims the benefit of U.S. Provisional Application No. 60/883,652, filed Jan. 5, 2007, and U.S. Provisional Application No. 60/957,937, filed Aug. 24, 2007, and this application further claims the benefit of U.S. Provisional Application No. 60/957,941, filed Aug. 24, 2007, all the recited applications being incorporated herein in their entirety by reference.

FIELD OF THE INVENTION

The present invention relates to mounts for flat panel displays, and more particularly to in-wall mounts for flat panel displays.

BACKGROUND OF THE INVENTION

Flat panel electronic displays have become very popular due to their compact size, desirable aesthetics, and superior performance. The inherent form factor and weight advantages of these displays have made large screen sizes economically and practically feasible, leading to rapidly increasing demand for these large screens.

Often, it is desirable to mount a flat panel display from a fixed structure such as a wall, ceiling, column or other structural feature. Consequently, specialized mounts have been developed to enable displays to be mounted from fixed structures, while also enabling selective positioning of the display for visibility or convenience.

One of the desirable aesthetic aspects of flat panel displays is the flat appearance of the display when mounted on a wall—resembling a framed photograph or painting. In order to enhance this flat appearance, it is desirable for the mounting structure to enable the rear side of the display to be mounted as close as possible to the wall surface. While very low profile fixed mounts have been developed, it is often desirable for the mount to enable selective positioning of the display. Such positionable mounts typically are thicker in depth and result in the back of the display being mounted further from the wall surface. For such mounts, it is desirable for the mount to be attached in a recess in the wall surface.

In-wall recessed mounts are typically disposed in a recess formed in a wall between the wall framing studs. A limitation of the present in-wall recessed mounts is that they are typically constrained to being centered between adjacent studs. It is rare, however, that the most desirable location for the mount is precisely centered between studs. Usually, the optimal aesthetic location for the display will be at a point that is closer to one adjacent stud than the other adjacent stud. In order to avoid these constraints and achieve the optimal location, a stud must often be cut and framed in much the same manner as framing in an opening for a window. Such framing can be an expensive modification that is both time consuming and messy in an existing structure.

Some prior adjustably positionable mounts include various arrangements of brackets and arms to enable tilting of the display screen. Examples of such tilt mounts are disclosed in U.S. Pat. No. 6,752,363 to Boele and U.S. Published Patent Application No. US20020033436A1 by Peng, et. al.; and U.S. Pat. Nos. 6,905,101 to Dittmer and 7,028,961 to Dittmer, et. al., each hereby fully incorporated herein by reference.

One advantage of flat-panel electronic display devices over CRTs is the appealing aesthetic of a very shallow device that resembles a framed photo or painting when mounted on a wall. As this aesthetic advantage has been achieved, users have become more discerning about aesthetics in general, desiring ever more accuracy of positioning of the display on a particular wall, and desiring the display to be positioned ever closer to the wall, while still retaining full positioning capability for the display.

There is a need then in the industry for an in-wall mount that may be centered at any lateral location between framing studs.

Previous mounting solutions have sometimes enabled the mounting arms or other apparatus to be stowed in an enclosure in the wall in order to enable closer positioning of the display to the wall. A disadvantage of these prior solutions, however, is that the in-wall enclosure must be attached to the wall studs in order to support the weight of the display, and thus the position of the in-wall enclosure is typically limited by the location of the wall studs. Enclosures have typically been made in a width to fit a standard stud spacing (e.g. 16 inches O.C.). This results in a large in-wall enclosure that may be unsightly. In addition, such enclosures cannot be installed in locations where the stud spacing is not at the standard width without cutting or relocating the studs, possibly compromising wall structural integrity and/or causing disruption and expense.

Where prior in-wall enclosures are narrower than the stud spacing, they typically have been attached to one or the other of the adjacent studs. This limits location of the in-wall enclosure to locations proximate studs, which may not be optimal for aesthetic purposes.

Further, prior mounting solutions, while sometimes enabling the display to be selectively positioned at a distance from the wall assembly, have typically experienced significant sag at greater distances from the wall, due to the significant weight of the display. This sag problem can be especially acute for heavy plasma displays, and can be unsightly.

What is still needed in the industry is an in-wall display mounting solution that addresses the drawbacks of prior in-wall display mounting solutions by enabling easy positioning of the display mount at nearly any position on a wall and that also counteracts display sagging when the display is positioned at a distance from the wall.

SUMMARY OF THE INVENTION

The centering in-wall mount of the present invention substantially meets the aforementioned needs of the industry. The centering in-wall mount eliminates the need for remodeling wall framing when mounting a recessed mount in a wall. Additionally, it provides for horizontal translation of the mount to position the flat panel display at virtually any desired location on the wall that is not directly obstructed by a stud.

Further, embodiments of the present invention may address the need of the industry for an in-wall display mounting solution that enables easy positioning of the display mount at nearly any position on a wall and that also counteracts display sagging when the display is positioned at a distance from the wall.

In an embodiment, the present invention is an in-wall mount for supporting a display, the in-wall mount being mountable in a wall formed in part by a plurality of studs, including mount structure fixedly couplable between selected adjacent studs of the wall, and a mount base laterally shiftably operably couplable to the mount structure. Embodiments of the present invention may further include methods for supporting a display.

BRIEF DESCRIPTION OF THE DRAWINGS

The invention may be more completely understood in consideration of the following detailed description of various embodiments of the invention in connection with the following drawings, in which:

FIG. 1 is a front cross-sectional view of the centering in-wall mounts of the present invention in the left most disposition having an affixed mount interface;

FIG. 2 is a front cross-sectional view of the centering in-wall mount of FIG. 1 in the right most disposition having an affixed mount interface;

FIG. 3 is a perspective view of the centering in-wall mount of FIG. 1 in a centered disposition;

FIG. 4 is a rear perspective view of the centering in-wall mount of FIG. 1;

FIG. 17 is a fragmentary front perspective view of an in-wall mount interface according to an embodiment of the invention with an external mounting track system depicted in phantom;

FIG. 18 is another fragmentary front perspective view of an in-wall mount interface according to an embodiment of the invention with portions of an external mounting track system depicted in phantom;

FIG. 19 is a fragmentary side elevation of the in-wall mounting assembly of an in-wall mount interface according to an embodiment of the invention with portions of the assembly depicted in phantom;

Figure 5:
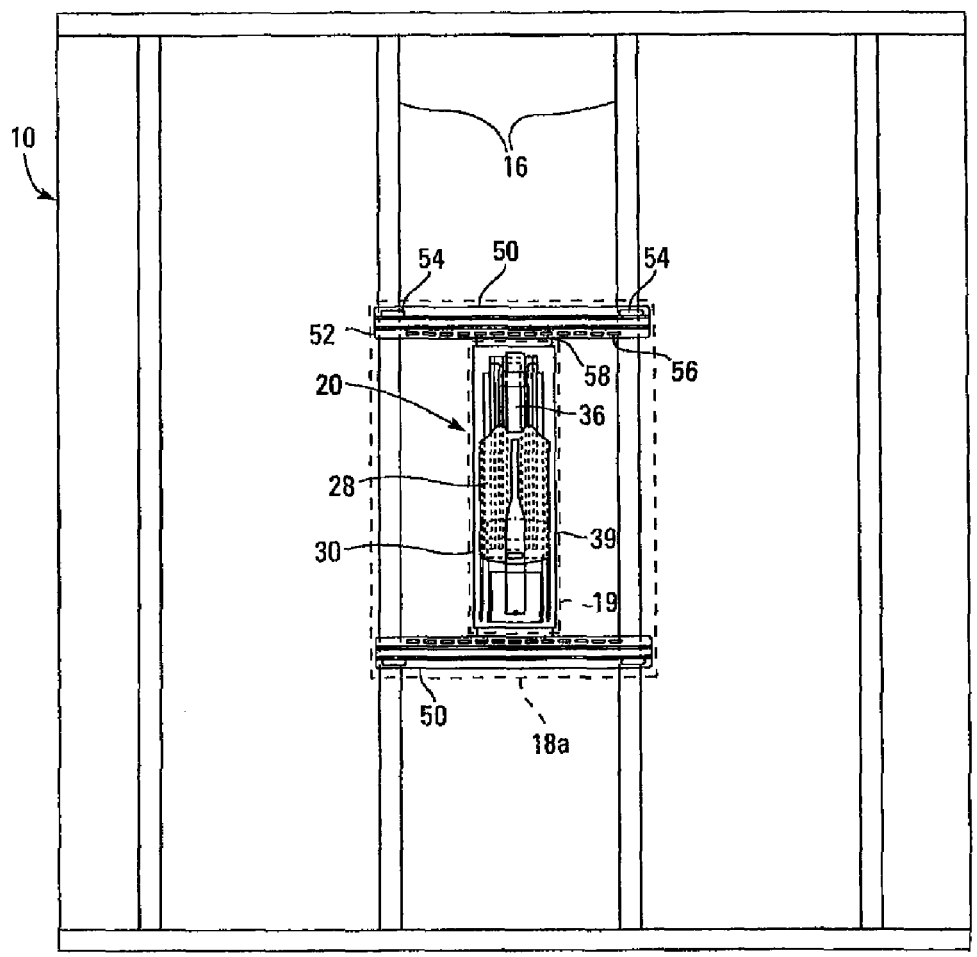
FIG. 5 is a front cross-sectional view of the centering in-wall mount of FIG. 3 depicted in the centering position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

A typical wall 10 is depicted in the figures. Wall 10 includes framing comprising a sill plate 12, an opposed parallel header 14, and studs 16. The header 14 is supported on the plurality of generally parallel vertical studs 16 that are mounted on top of the sill plate 12 and extend upward to the header 14. Dry wall sheeting 18 is affixed to the wall framing to complete the wall structure. A rectangular aperture 19 is defined in the dry wall 19 between two adjacent studs 16. The aperture 19 is formed just slightly bigger than the exterior dimensions of the mount 20.

The centering in-wall mount 20 of the present invention includes two major subcomponents: mount box 21 and mount base 28. The mount box 21 is preferably made of relatively heavy structural material in order to support the cantilevered weight of a flat panel display and is fixedly secured to the adjacent studs 16 on either side of the aperture 19. The mount box 21 has a top 40 and an opposed bottom 42 that are joined by opposed parallel sides 44. A back plate 46 extends between the top 40, bottom 42 and sides 44. The mount box 21 is open facing the viewer in FIG. 1.

The mount box has a height 22, a width 24, and a depth 26. The width 24 of the mount box 21 is selected to be such that the mount box 21 fits between two adjacent studs 16. Typically, the studs 16 are either 16" on center or 20" on center. In both cases the width dimension 24 is selected to be the width of a stud less the applicable on center dimension. The depth dimension 26 of the mount box 21 is selected to be no greater than the depth dimension of a stud 16. For a standard 2×4 inch stud 16, the depth 26 is approximately 3½ inches.

The mount base 28 is laterally shiftably disposable within the mount box 21. The mount base 28 is fixedly mounted to the back plate 46 by bolts as being mounted in bore 29.

Figure 8:
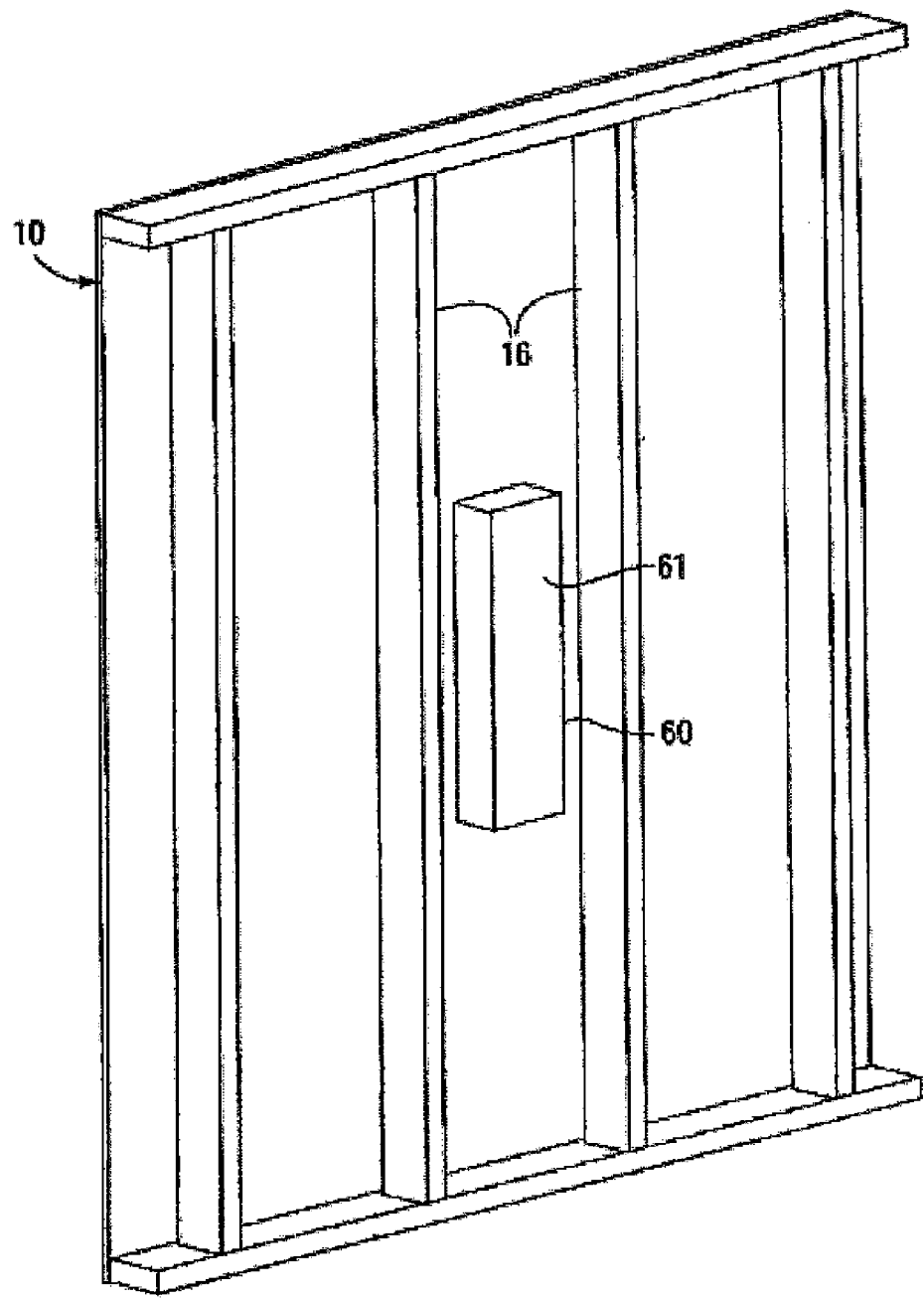
FIG. 8 is a rear perspective view of the centering in-wall mount having a mount box according to an embodiment of the present invention.

The mount base 28 has a footprint 30. The footprint 30 has a relatively narrow width 32 relative to the width dimension 24 of the mount box 21. Preferably, the width dimension 32 of the mount base 28 is about 4". Accordingly, as can be seen in FIGS. 1 and 2, the mount base 28 can be mounted in the mount box 21 at virtually any position between the two adjacent studs 16, thereby effecting the centering capability of the mount 20. In this manner, the flat panel display can be mounted at any location along a wall with the exception of where an actual stud 16 is located. The mount base 28 further has a height dimension 34. The mount base 28 includes extendable mount structure 36. A mount frame 38 is shiftably coupled to the extendable mount structure 36. The mount frame 38 provides the mounting interface between the flat panel display and the centering mount 20. Referring to FIG. 8, an embodiment of the mount box 60 is sized such that the back plate 61 approximates the size of the footprint 30 of the mount base 28.

Figure 6:
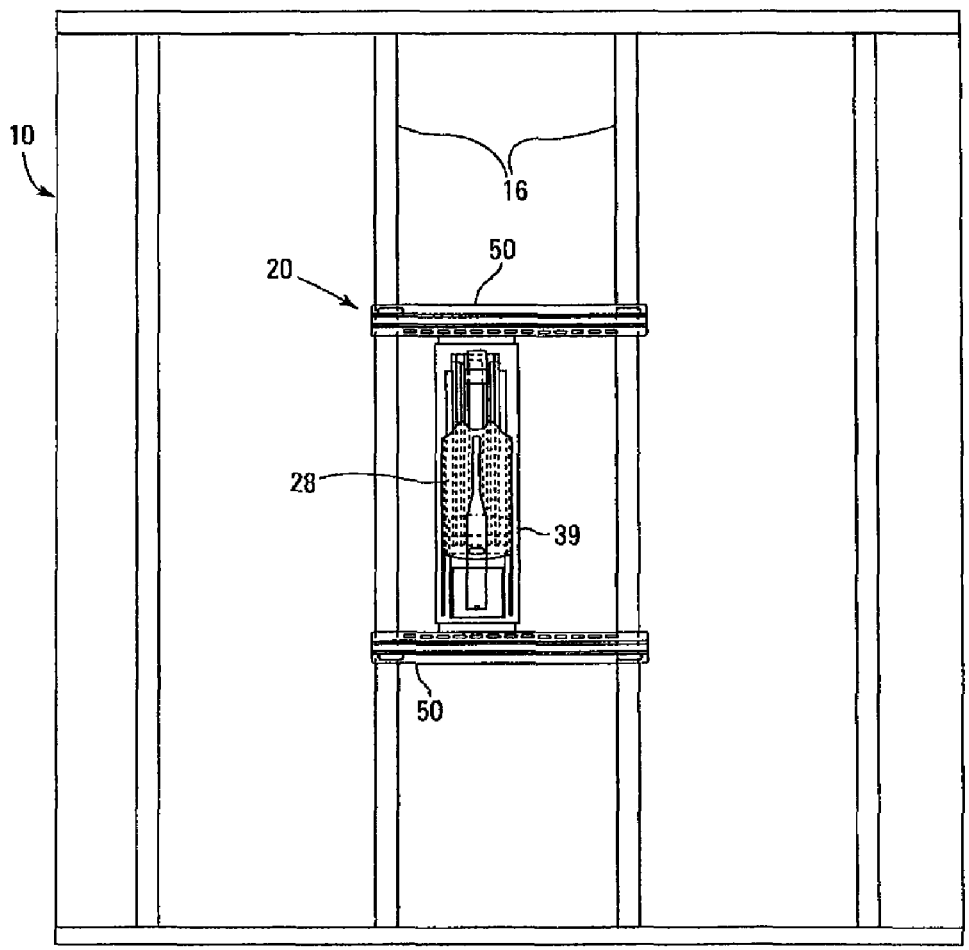
FIG. 6 is a front cross-sectional view of the centering in-wall mount of FIG. 5 in a leftward disposition.
Figure 7:
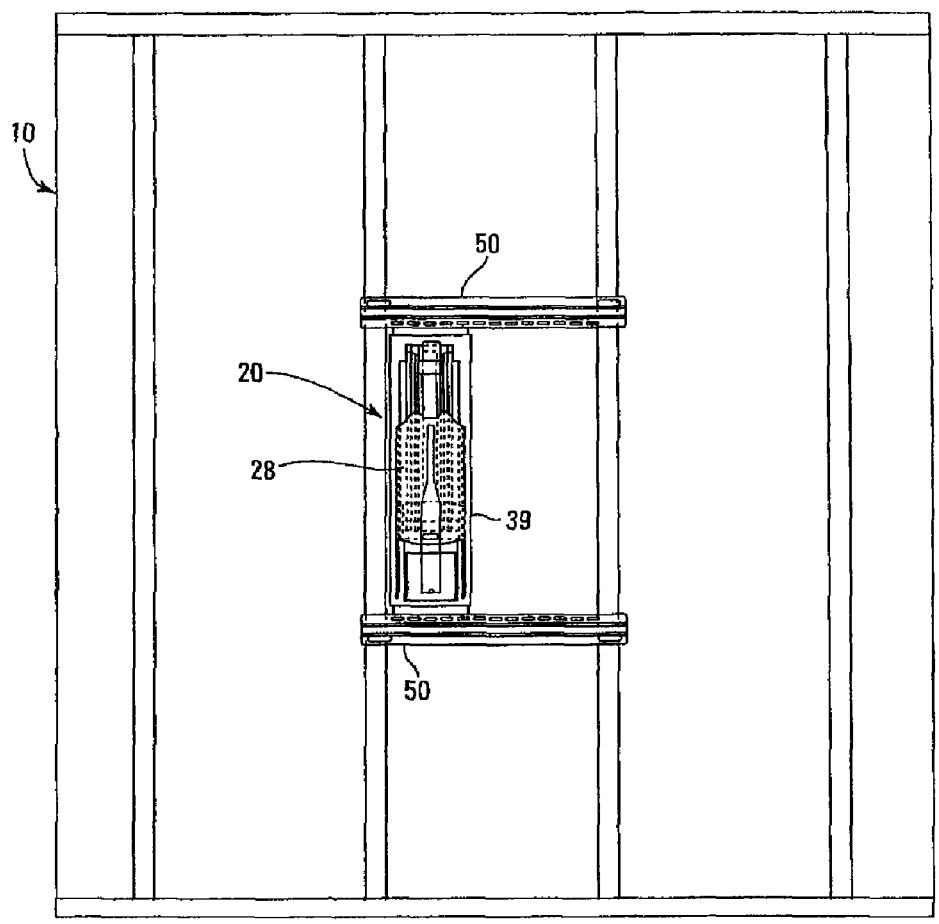
FIG. 7 is a front cross-sectional view of the centering in-wall mount of FIG. 5 in a left most disposition.

A second embodiment of the centering mount 20 is depicted in FIGS. 5-8. The centering mount 20 of the second embodiment retains the versatility exhibited by the centering mount 20 of the first embodiment by being positionable at virtually any position between two adjacent studs 16 as depicted in FIGS. 5-7. In distinction, the second embodiment of the centering mount 20 employs a narrow housing 39 which is attached between two spaced apart horizontal brackets 50. Preferably, the brackets 50 are identical and when mounted in the wall 10 are inverted with respect to one another.

Each of the brackets 50 is formed of a ribbed plate 52 possessing significant structural strength to support the flat panel display. On a first side of the ribbed plate 52, a pair of spaced apart elongate stud mounting slots 54 are defined. On the opposed side of the ribbed plate 52, a plurality of elongate base mounting slots 56 are defined. The brackets 50 may be fixedly mounted to the studs 16 by means of lag bolts or similar fasteners passed through the slots 54 and into the wood of the respective studs 16. The brackets 50 may be slightly recessed into the respective studs 16 and drywall 18 applied over the brackets 50 to create a more appealing appearance of the wall 10.

An aperture 19 only slightly greater than the footprint 30 of the base 28 is defined in the drywall 18 at any desired location between the two adjacent studs 16. An aesthetic advantage of the second embodiment as compared to the first embodiment is that the aperture 19 need only be as great as the footprint 30, making the interface of the centering mount 20 with the wall 10 less obtrusive. It should be noted that the mounting base 28 can be positioned at virtually any position left or right between the two adjacent studs 16. Once in the selected position, the housing 39 of the mounting base 28 is affixed to the two brackets 50 by couplers 58 extending between the mounting base 28 and the base mounting slots 56. It will be appreciated that in other embodiments, housing 39 may be omitted and the mounting base 28 attached directly to the brackets 50.

An embodiment of an in-wall mount interface 120 for interfacing a display mounting assembly 122 with a wall assembly 124 of a structure is depicted generally and in its various component parts in FIGS. 9-25. Interface 120 generally includes housing assembly 126 and extensible arm assembly 128.

Figure 9:
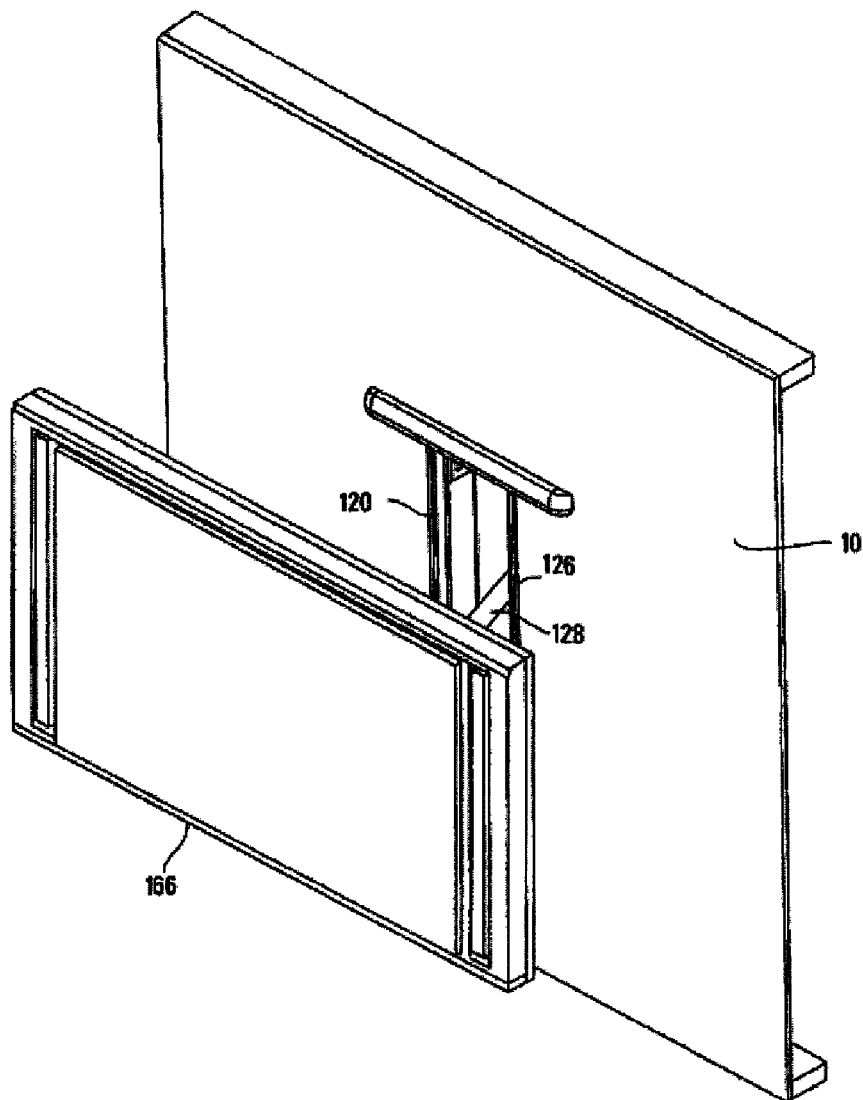
FIG. 9 is a perspective view of an in-wall mount interface according to an embodiment of the invention in a wall assembly and with a flat panel electronic display mounted thereon and shifted away from the wall assembly.
Figure 10:
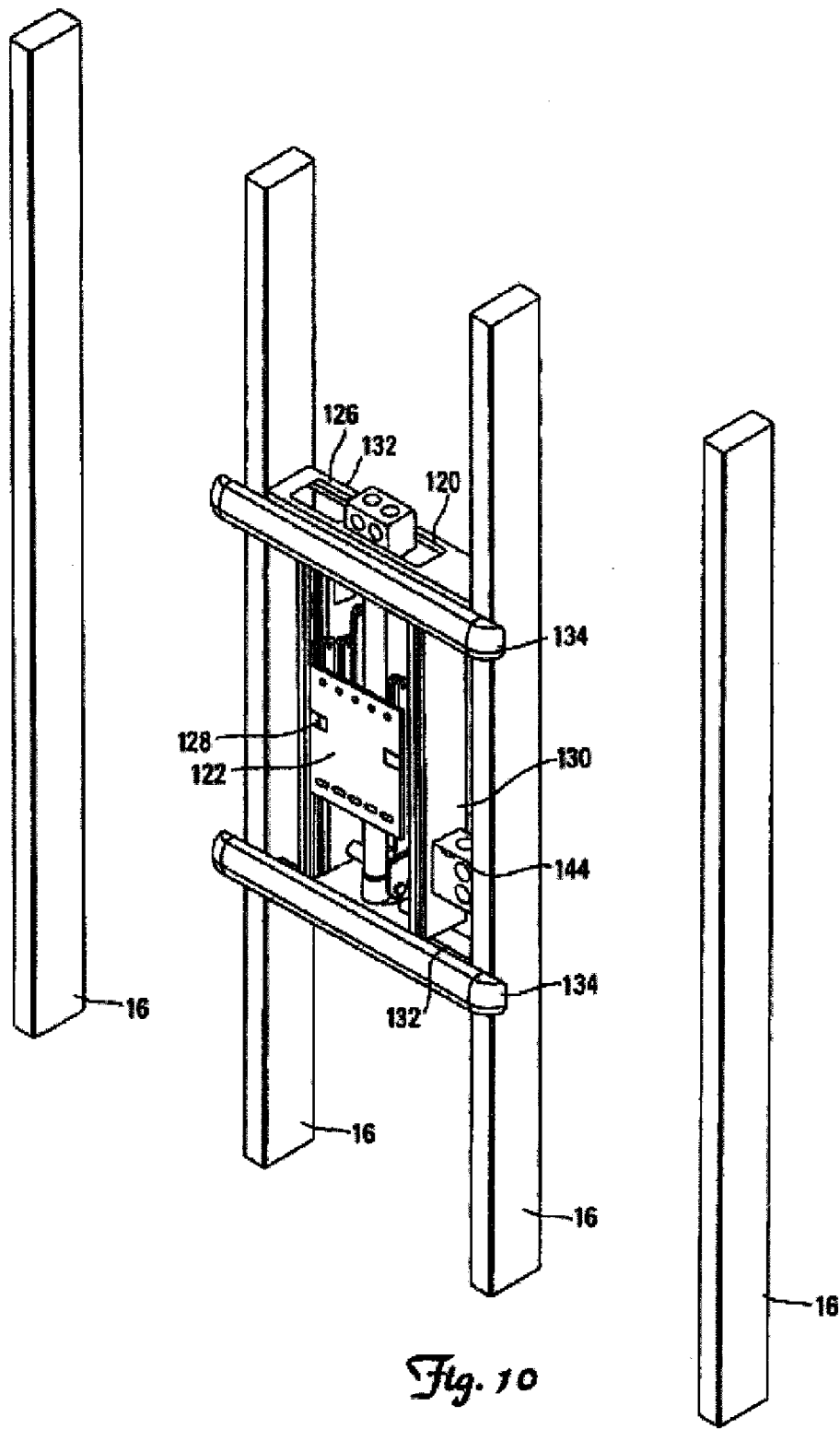
FIG. 10 is a perspective view of the in-wall mount interface of FIG. 9 depicted in a retracted position and with the studs of the wall assembly exposed.
Figure 16:
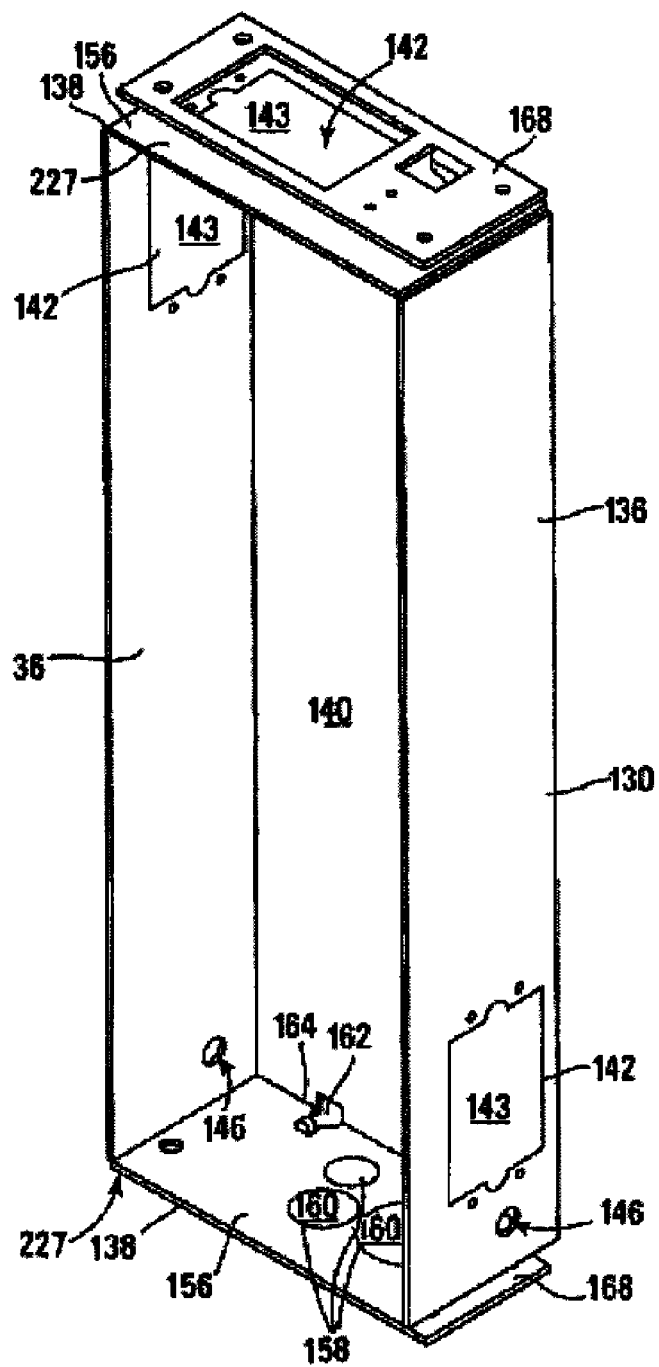
FIG. 16 is a front perspective view of a housing of the in-wall mount interface of FIG. 9.

Referring to FIGS. 9-12, housing assembly 126 generally includes housing 130, in-wall mounting assembly 132, and external mounting assembly 134. Housing 130, as depicted in FIG. 16, generally includes sidewalls 136, end walls 138, and back wall 140. It should be noted that housing 130 may be made from metal, polymer, or other material having sufficient structural strength to bear loads imposed by arm assembly 128 and display 166 mounted thereon. Sidewalls 136 define knockout openings 142 with knockout panels 143 for selectively receiving a standard electrical box 144, as depicted in FIG. 10. Sidewalls 136 further define horizontally registered apertures 146 for receiving lower pivot axle 148 of arm assembly 128. Upper end wall 150 defines a knockout opening 142 with a knockout panel 143 for selectively receiving a standard electrical box 144. Upper end wall 150 further defines locator notch 152 along rear edge 154. Lower end wall 156 may define a plurality of knockout openings 158, each with a knockout plug 160, for selectively receiving conduit, the conduit bearing signal or other wiring or cabling. Lower end wall 156 further defines locator notch 162 along rear edge 14.

Figure 22:
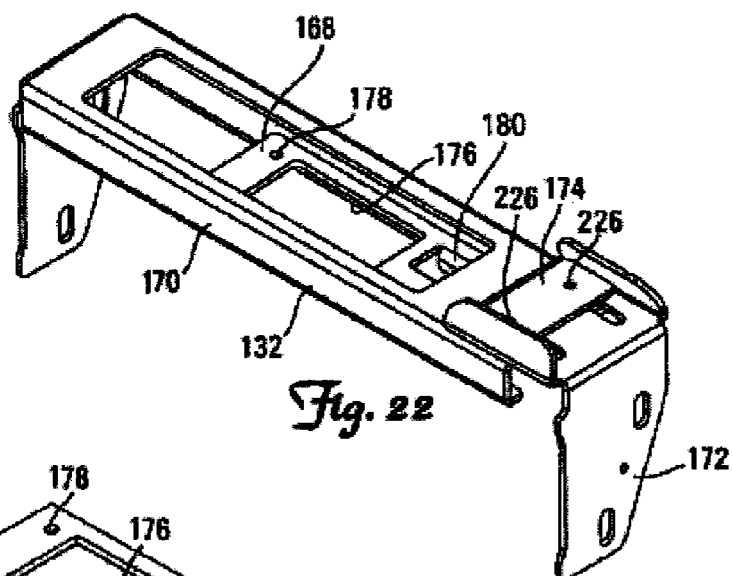
FIG. 22 is a perspective view of an in-wall mounting assembly for an in-wall mount interface according to an embodiment of the invention.
Figure 23:
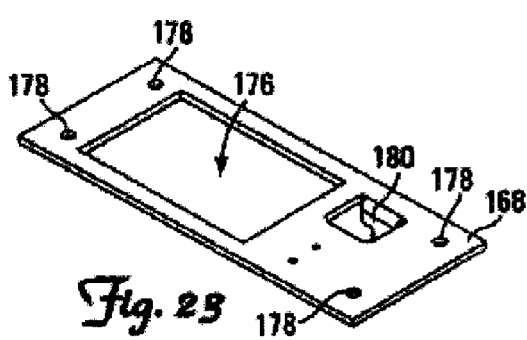
FIG. 23 is a perspective view of a housing interface component of the in-wall mounting assembly depicted in FIG. 22.
Figure 25:
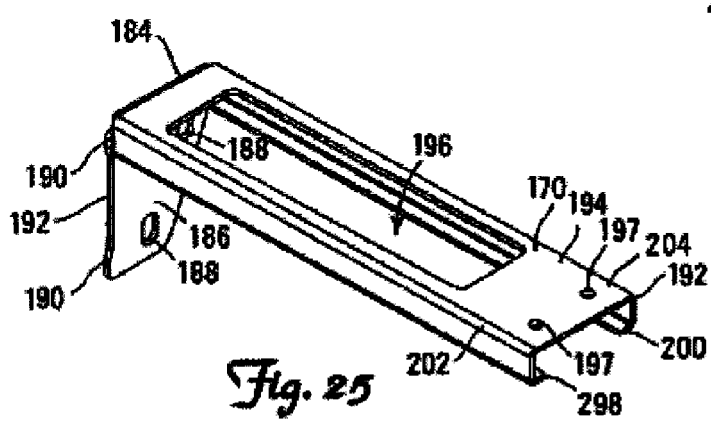
FIG. 25 is a perspective view of a carrier component of the in-wall mounting assembly depicted in FIG. 22.

Housing 130 may be secured in wall assembly 124 with transverse in-wall mounting assemblies 132 located at the top and bottom of housing 130. See FIGS. 10 and 22. Each in-wall mounting assembly 132 generally includes interface plate 168, carrier 170, end flange 172, and retainer 174. As depicted in FIGS. 22 and 23, interface plate 168 defines central aperture 176 and fastener holes 178 and includes projecting tab 180. Carrier 170, depicted in FIG. 25, presents inner end 182 and outer end 184. Wall engaging flange 186 projects perpendicularly proximate outer end 184 and defines elongate apertures 188. Projections 190 are defined in forward edge 192. Main body portion 194 defines central aperture 196 and fastener holes 197, and has channels 198, 200, defined along lateral edges 202, 204, respectively.

Figure 24:
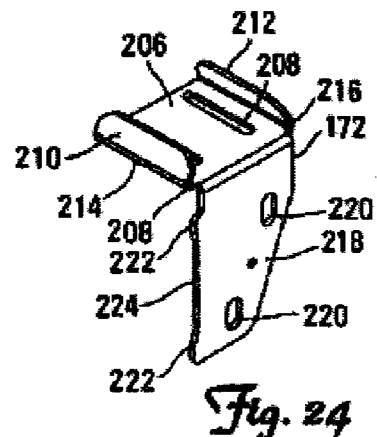
FIG. 24 is a perspective view of an end flange component of the in-wall mounting assembly depicted in FIG. 22.

As depicted if FIG. 24, end flange 172 generally includes interface portion 206 defining elongate apertures 208, and presenting guides 210, 212, along lateral edges 214, 216, respectively, and wall engaging flange 218 projecting perpendicularly therefrom. Flange 218 defines elongate apertures 220 and presents projections 222 along forward edge 224.

Retainer 174, depicted in FIG. 22, is generally rectangular in shaped and overlies interface portion 206 of end flange 172. Retainer 174 defines threaded fastener holes 226.

Figure 15:
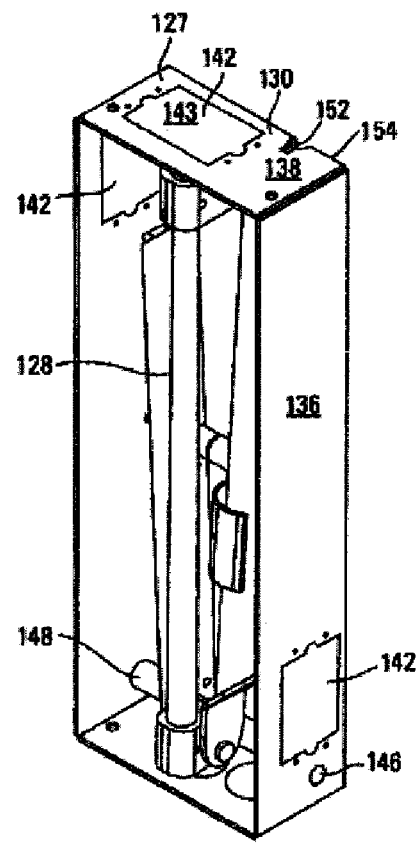
FIG. 15 is a front perspective view of the housing and arm assembly of the in-wall mount interface of FIG. 9 with the arm assembly in a retracted position.

Referring to FIGS. 15 and 16, each interface plate 168 is received and secured on outer side 227 of each end wall 156 of housing 130, with projecting tab 180 engaged in locator notch 152, 162. Central aperture 176 registers with knockout opening 142 or with knockout openings 158, depending on which end wall 156 that interface plate 168 is received. Carrier 170 is secured to one of studs 16 (see FIG. 10) of wall assembly 124 with lag bolts (not depicted) through each of elongate apertures 188. Apertures 188 may be staggered as depicted in FIG. 25 to inhibit splitting of wood studs 16 by the lag bolts. End flange 172 is secured to an opposing one of studs 16 with lag bolts (not depicted) through elongate apertures 220. Apertures 220 may be staggered as depicted to inhibit splitting of wood studs by the lag bolts. End flange 172 is secured to carrier 170 at inner end 182 with fasteners (not depicted) extending through holes 197, elongate apertures 208 and threaded into holes 226 in retainer 174. Referring to FIGS. 22 and 24, end flange 172 is slidable relative to carrier 170 by means of elongate apertures 208, thereby enabling the variable spacing between wall engaging flange 186 and wall engaging flange 218 to be adjusted to accommodate the spacing between studs 16. Projections 190, 222, depicted in FIG. 17 engage rear surface of sheet rock 18 as depicted in FIG. 1.

Interface plate 168 (see FIGS. 16 and 23) is received in channels 198, 200, of carrier 170 (see FIGS. 22 and 25) and is slidable therein to enable housing 130 to be positioned anywhere between wall engaging flange 186 and wall engaging flange 218, and thereby anywhere between adjacent studs 228 as may be desired. It will be appreciated that the location of knockout openings 142 on both sidewalls 136 and on upper end wall 156 of housing 130 (see FIG. 16) enables at least two electrical boxes 144 to be used with housing 130 regardless of the position of housing 130 relative to adjacent studs 228.

As an alternative to in-wall mounting assembly 132, housing 130 may be secured in wall assembly 124 using external mounting assemblies 134. Each external mounting assembly 134, as depicted in FIGS. 17-21, generally includes housing flange 236, wall track 238, spacers 240, and cover assembly 242.

Housing flange 236, depicted in FIG. 17, being generally L shaped in cross section, generally includes housing interface portion 244 with wall flange 246 extending perpendicularly therefrom. Housing flange 236 is secured to end wall 138 with one or more fasteners 248. Rear side 250 of wall flange 246 abuts front surface of sheet rock 18, depicted in FIG. 1. Wall track 238 defines a plurality of elongate apertures 254 and abuts front side 256 of both the wall flange 246 and the spacers 240. Wall track 238 is secured to wall assembly 124 with fasteners 258 extending through elongate apertures 254 and apertures 260 defined in wall flange 246. By inserting fasteners 258 through different elongate apertures 254 and by sliding fasteners 258 in the elongate apertures 254, housing 130 may be positioned at nearly any desired position between respective adjacent studs 16 of FIG. 10.

As depicted in FIGS. 10-15, extensible arm assembly 128 generally includes lower pivot axle 148 as previously specified, along with lower arm 262, upper arm 264, central axle assembly 266, knuckles 268, 270, outer column 272, guide track 274 and guide roller 276.

Figure 12:
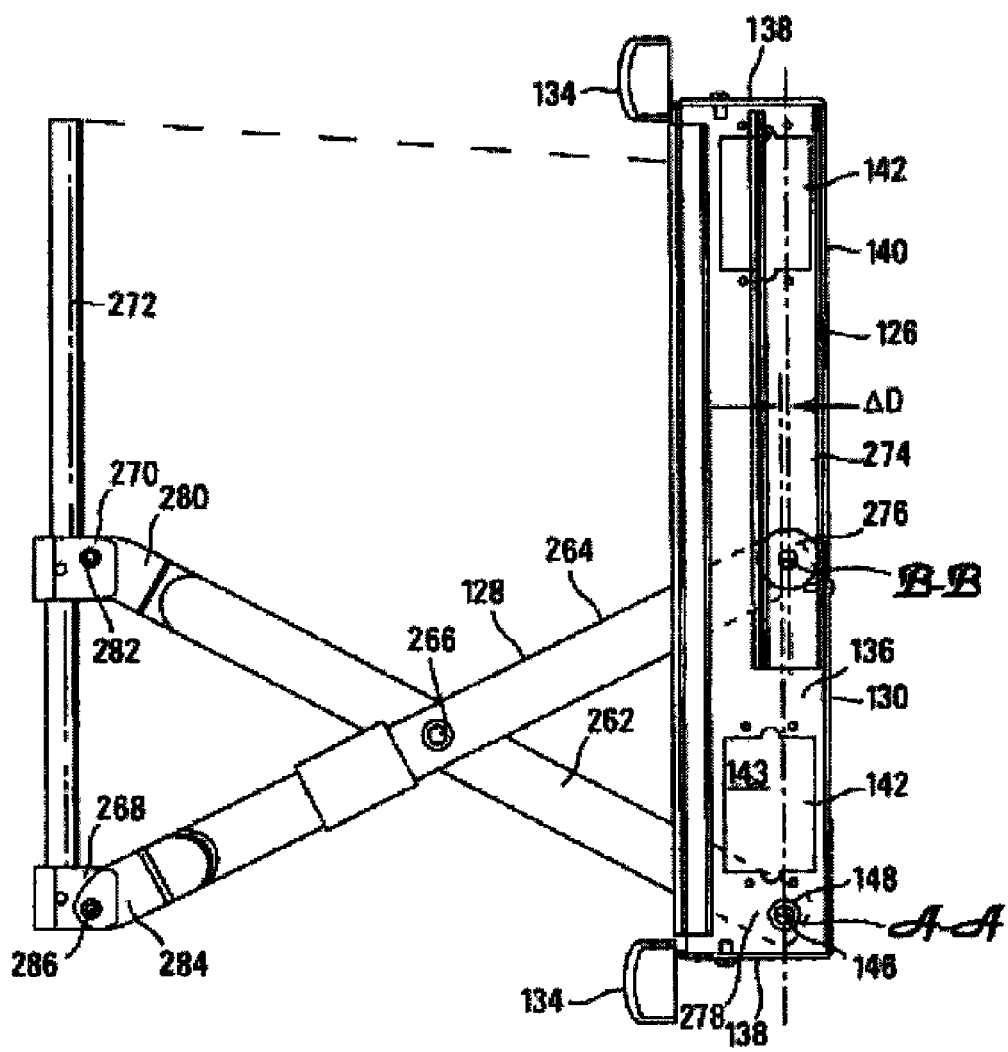
FIG. 12 is an opposite side elevation view of the in-wall mount interface of FIG. 9 with the housing depicted in phantom.
Figure 13:
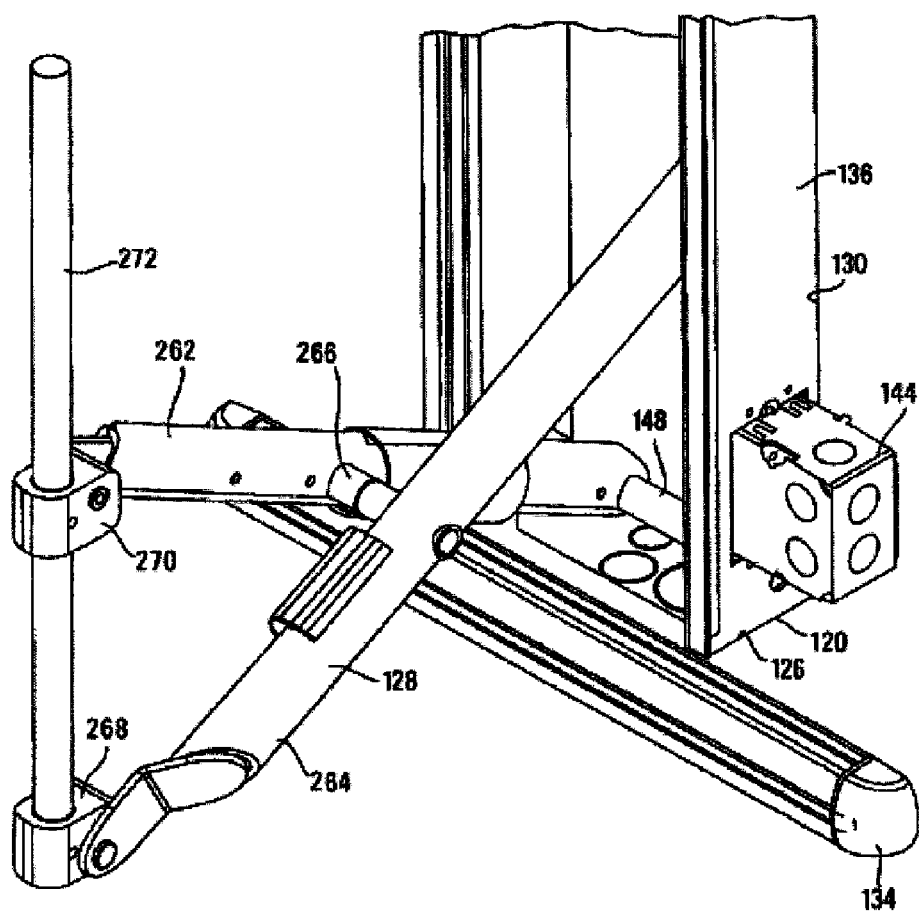
FIG. 13 is a fragmentary front perspective view of the in-wall mount interface of FIG. 9.
Figure 14:
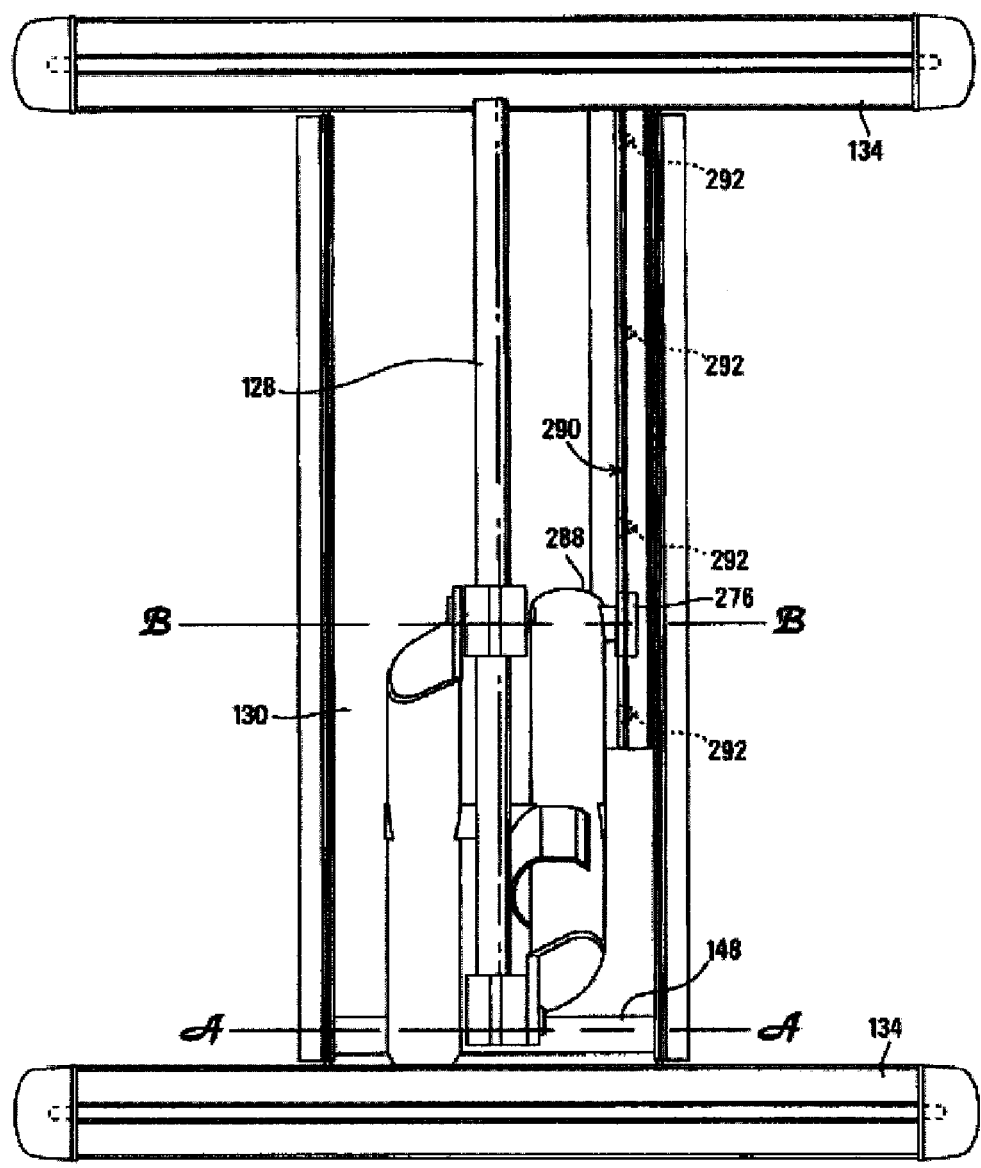
FIG. 14 is a front elevation view of the in-wall mount interface of FIG. 9.
Figure 20:
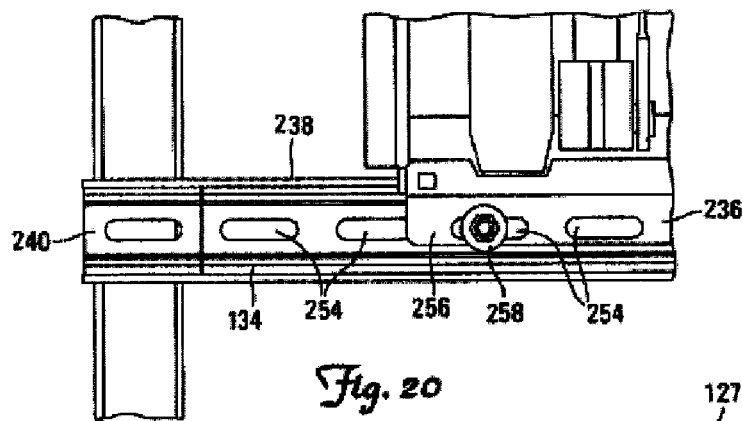
FIG. 20 is a fragmentary front elevation view of an in-wall mount interface according to an embodiment of the invention with portions of an external mounting track system depicted in phantom.
Figure 21:
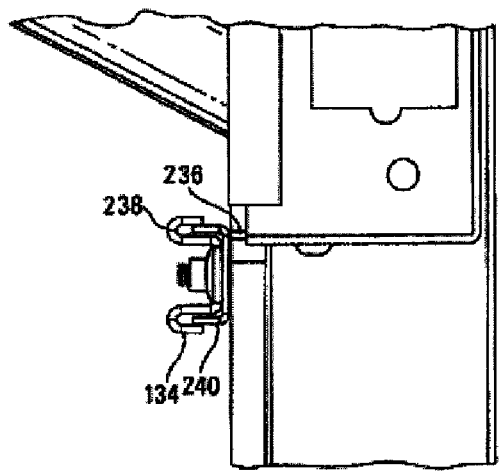
FIG. 21 is a side elevation view of the external mounting track system depicted in FIG. 20.

Lower pivot axle 148 extends between apertures 146 and pivotally receives inner end 278 of lower arm 262, such that lower arm 262 pivots about axis A-A of FIG. 12. Outer end 280 of lower arm 262 is pivotally attached to knuckle 270 at pivot 282. Outer end 284 of upper arm 264 is pivotally attached to knuckle 268 at pivot 286. Inner end 288 of upper arm 264 is operably coupled with guide roller 276 such that upper arm 264 pivots about axis B-B of FIG. 12. Guide roller 276 also rolls in channel 290 defined by guide track 274. Guide track 274 is secured to rear wall 140 of housing 130 with fasteners 192. Outer column 272 rests on knuckle 268 and is fixed thereto, while knuckle 270 is slidable up and down on outer column 272. Lower arm 262 and upper arm 264 are pivotally coupled to each other in scissors fashion with central axle assembly 266. Mounting head 294 is received on outer column 272, and couples display 166 with arm assembly 128. Details of mounting head 294 are disclosed in International Patent Application No. PCT/US2008/000117, filed Jan. 4, 2008, hereby fully incorporated herein by reference.

Figure 11:
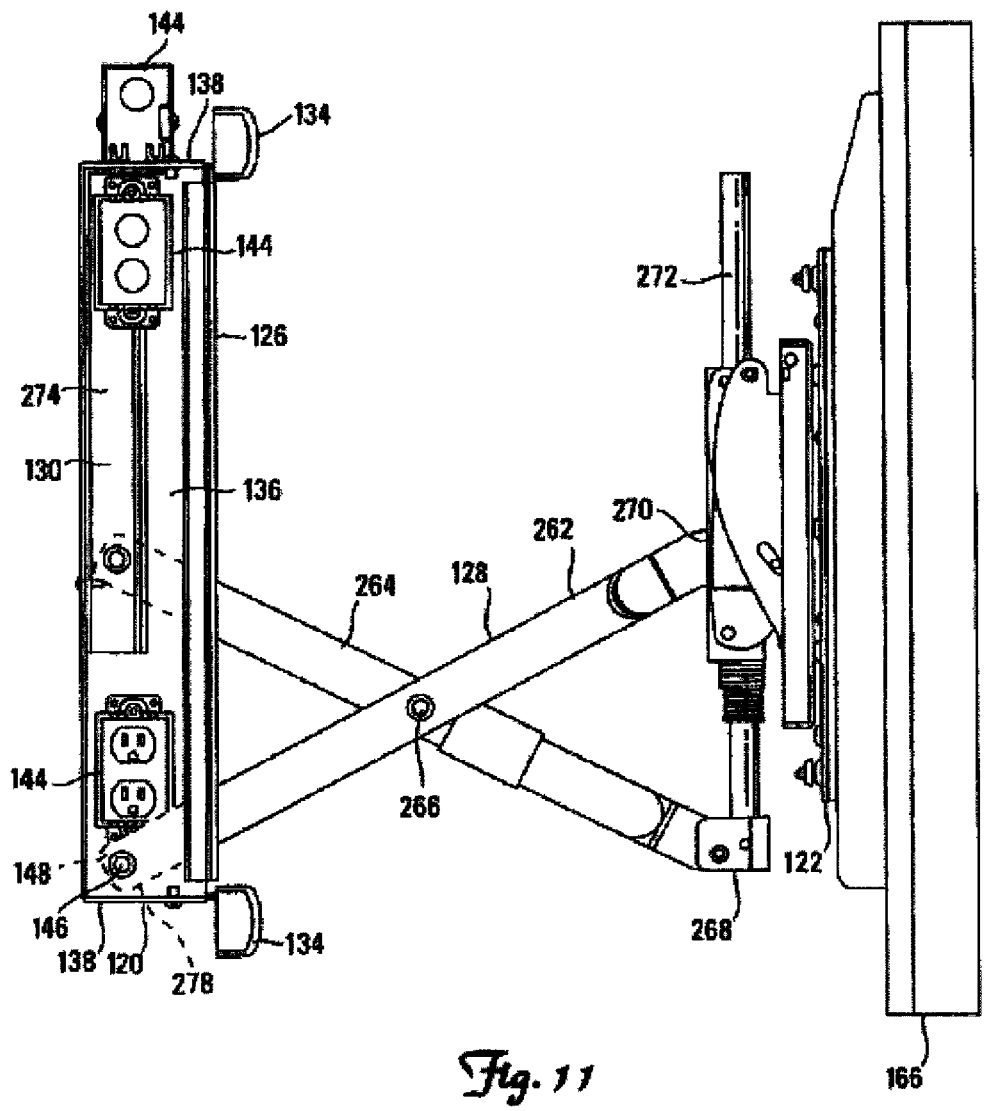
FIG. 11 is a side elevation view of the in-wall mount interface of FIG. 9 with the housing depicted in phantom.

In use, arm assembly 128 may be folded into housing 130, as depicted in FIGS. 10 and 15, in order to place display 166 proximate, or even in contact with, wall assembly 124 of FIG. 9. As a user pulls display 166 away from wall assembly 124, lower arm 262 pivots on lower pivot axle 148, guide roller 276 rolls downward in guide track 274, and knuckle 270 slides downward on outer column 272 to enable lower arm 262 and upper arm 264 to pivot in scissors fashion relative to each other to support display 166 away from wall assembly 124 as depicted in FIG. 11.

With either embodiment, an aperture may be formed in the sheet rock 18 that closely conforms to the desired location of housing 130 relative to studs 16. A thin trim ring 300 (see FIG. 9) may then be disposed around the opening to cover any unsightly edges of the sheet rock 234.

In embodiments of the invention, axis A-A is positioned slightly closer to the front of housing 130 than axis B-B, as depicted in FIG. 12, by the dimension ΔD. Arms 262, 264 may be of unequal length. This lateral displacement of the respective couplings of the lower arm 262 and the upper arm 264 causes the outer column 272 and the display 166 attached thereto to rise in elevation slightly along an arcuate path as display 166 is shifted away from wall assembly 124, thereby counteracting sag of arm assembly 128 due to bending thereof from the weight of display 166. It will be appreciated that the rate of rise of outer column 272 and display 166 inherently increases with the distance of outer column 272 and display 166 from wall assembly 124. The distance ΔD by which axis A-A is located forward of axis B-B, as depicted in FIG. 12, may be varied depending on the degree and rate of rise desired for outer column 272. Generally, without limitation, distance ΔD may vary between 1/16 inch and 2 inches, the greater the distance ΔD resulting in a greater amount of vertical rise.

Those of ordinary skill will appreciate that, in the depicted embodiments, the weight of display 166 inherently applies a moment force tending to urge display 166 away from the wall due to the locations of the fixed pivotal connections of arms 262, 264, with housing 130 and outer column 272 vertically below the sliding connections of arms 262, 264, with housing 130 and outer column 272. It will be further appreciated, however, that this force may be at least partially counteracted by the positioning of axis A-A forward of axis B-B as previously described, making display 166 rise vertically as it moves away from housing 130. By balancing these forces, display 166 may self balance in a desired spaced apart position from the wall without additional friction being added to the assembly.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An in-wall mount for supporting an electronic display from a wall of a fixed structure, the wall including at least a pair of generally vertically oriented studs, the mount comprising:
    a wall interface structure including a housing;
    a display interface structure; and
    an extensible arm assembly operably coupling the display interface structure with the wall interface structure such that the display interface structure is selectively laterally outwardly shiftable relative to the wall interface structure between a first position wherein the display interface structure is proximate the wall interface structure and the extensible arm assembly is substantially within the housing, and a second position wherein the display interface structure is spaced apart from the wall interface structure, the display interface structure rising vertically relative to the wall interface structure as the display interface structure is shifted from the first position to the second position.

2. The in-wall mount of claim 1, wherein the extensible arm assembly comprises a first elongate arm presenting a pair of opposing ends and a second elongate arm presenting a pair of opposing ends, the first arm pivotally coupled with the second arm intermediate the pair of opposing ends of the first arm and intermediate the pair of opposing ends of the second arm.

3. The in-wall mount of claim 2, wherein a first one of the opposing ends of the first arm is pivotally coupled to the housing of the wall interface structure and a second one of the opposing ends of the first arm is pivotally coupled to a slider on the display interface structure, and wherein a first one of the opposing ends of the second arm is pivotally coupled to the display interface structure and a second one of the opposing ends of the second arm is pivotally coupled to a slider on the wall interface structure, the slider of the display interface structure and the slider of the wall interface structure each arranged to slide substantially vertically as the display interface structure is shifted between the first position and the second position.

4. The in-wall mount of claim 3, wherein the pivotal connection of the first arm with the housing is disposed generally below the slider of the wall interface structure.

5. The in-wall mount of claim 4, wherein the housing defines an opening for receiving the extensible arm assembly therethrough, a pivot axis defined by the pivotal connection of the first arm with the housing being disposed closer in a generally horizontal direction to the opening than a pivot axis defined by the pivotal connection of the second arm with the slider of the wall interface structure.

6. The in-wall mount of claim 1, wherein the wall interface structure further includes attachment structure for coupling the housing with the wall, the attachment structure enabling selective lateral shifting of the housing in a generally horizontal direction between the studs of the wall.

7. The in-wall mount of claim 6, wherein the attachment structure is adapted to be substantially received between the studs of the wall.

8. The in-wall mount of claim 7, wherein the attachment structure comprises a pair of in-wall mounting assemblies, each in-wall mounting assembly presenting a pair of spaced apart stud interface flanges, the stud interface flanges being selectively shiftable relative to each other to accommodate a plurality of different spacings of the studs of the wall.

9. The in-wall mount of claim 1, wherein the housing comprises a top wall, a bottom wall, and a pair of opposing side walls, each of the top, bottom, and side walls including means for accommodating an electrical connection therethrough.

10. The in-wall mount of claim 9, wherein the wall interface structure further includes attachment structure for coupling the housing with the wall, the attachment structure enabling selective lateral shifting of the housing in a generally horizontal direction between the studs of the wall, the attachment structure comprising a pair of in-wall mounting assemblies, each in-wall mounting assembly presenting a pair of spaced apart stud interface flanges, the stud interface flanges being selectively shiftable relative to each other to accommodate a plurality of different spacings of the studs of the wall.

11. An in-wall mount for supporting an electronic display from a wall of a fixed structure, the wall including at least a pair of generally vertically oriented studs, the mount comprising:
  a wall interface structure including a housing;
  a display interface structure; and
  an extensible arm assembly operably coupling the display interface structure with the wall interface structure such that the display interface structure is selectively laterally outwardly shiftable relative to the wall interface structure between a first position wherein the display interface structure is proximate the wall interface structure and the extensible arm assembly is substantially within the housing, and a second position wherein the display interface structure is spaced apart from the wall interface structure,
  the wall interface structure including attachment structure for coupling the housing with the wall, the attachment structure enabling selective lateral shifting of the housing in a generally horizontal direction between the studs of the wall.

12. The in-wall mount of claim 11, wherein the attachment structure comprises a pair of in-wall mounting assemblies, each in-wall mounting assembly presenting a pair of spaced apart stud interface flanges, the stud interface flanges being selectively shiftable relative to each other to accommodate a plurality of different spacings of the studs of the wall.

13. The in-wall mount of claim 12, wherein the housing comprises a top wall, a bottom wall, and a pair of opposing side walls, each of the top, bottom, and side walls including means for accommodating an electrical connection therethrough.

14. The in-wall mount of claim 11, wherein the extensible arm assembly is arranged such that the display interface structure rises vertically relative to the wall interface structure as the display interface structure is shifted from the first position to the second position.

15. The in-wall mount of claim 14, wherein the extensible arm assembly comprises a first elongate arm presenting a pair of opposing ends and a second elongate arm presenting a pair of opposing ends, the first arm pivotally coupled with the second arm intermediate the pair of opposing ends of the first arm and intermediate the pair of opposing ends of the second arm.

16. The in-wall mount of claim 15, wherein a first one of the opposing ends of the first arm is pivotally coupled to the housing of the wall interface structure and a second one of the opposing ends of the first arm is pivotally coupled to a slider on the display interface structure, and wherein a first one of the opposing ends of the second arm is pivotally coupled to the display interface structure and a second one of the opposing ends of the second arm is pivotally coupled to a slider on the wall interface structure, the slider of the display interface structure and the slider of the wall interface structure each arranged to slide substantially vertically as the display interface structure is shifted between the first position and the second position.

17. An electronic display system for mounting on a wall of a fixed structure, the wall including at least a pair of generally vertically oriented studs, the system comprising:
  an electronic display;
  a wall interface structure including a housing;
  a display interface structure operably coupled with the electronic display; and
  means for operably coupling the display interface structure with the wall interface structure such that the display interface structure is selectively laterally outwardly shiftable relative to the wall interface structure between a first position wherein the display interface structure is proximate the wall interface structure and the extensible arm assembly is substantially within the housing, and a second position wherein the display interface structure is spaced apart from the wall interface structure, the display interface structure rising vertically relative to the wall interface structure as the display interface structure is shifted from the first position to the second position.

18. The system of claim 17, wherein the means for operably coupling the display interface structure with the wall interface structure comprises an extensible arm assembly having a first elongate arm presenting a pair of opposing ends and a second elongate arm presenting a pair of opposing ends, the first arm pivotally coupled with the second arm intermediate the pair of opposing ends of the first arm and intermediate the pair of opposing ends of the second arm.

19. The system of claim 18, wherein a first one of the opposing ends of the first arm is pivotally coupled to the housing of the wall interface structure and a second one of the opposing ends of the first arm is pivotally coupled to a slider on the display interface structure, and wherein a first one of the opposing ends of the second arm is pivotally coupled to the display interface structure and a second one of the opposing ends of the second arm is pivotally coupled to a slider on the wall interface structure, the slider of the display interface structure and the slider of the wall interface structure each arranged to slide substantially vertically as the display interface structure is shifted between the first position and the second position.

20. The system of claim 19, wherein the pivotal connection of the first arm with the housing is disposed generally below the slider of the wall interface structure.

21. The system of claim 20, wherein the housing defines an opening for receiving the extensible arm assembly therethrough, a pivot axis defined by the pivotal connection of the first arm with the housing being disposed closer in a generally horizontal direction to the opening than a pivot axis defined by the pivotal connection of the second arm with the slider of the wall interface structure.

* * * * *